United States Patent [19]

Todoh

[11] Patent Number: 4,470,055

[45] Date of Patent: Sep. 4, 1984

[54] PHOTO-THERMAL INK TRANSFERRING DEVICE

[75] Inventor: Hidemasa Todoh, Ebina, Japan

[73] Assignee: Fuji Xerox Co., Ltd., Tokyo, Japan

[21] Appl. No.: 472,661

[22] Filed: Mar. 7, 1983

[30] Foreign Application Priority Data

Mar. 10, 1982 [JP] Japan .................................. 57-37581
Mar. 10, 1982 [JP] Japan .................................. 57-37582

[51] Int. Cl.$^3$ ............................................. G01P 15/10

[52] U.S. Cl. ................................. 346/140 R; 346/76; 400/120

[58] Field of Search ................... 346/140, 76 PH, 1.1, 346/76 L, 151, 108, 160, 76 R, 153.1, 135.1, 137; 400/119, 120; 250/318; 118/644, 643

[56] References Cited

U.S. PATENT DOCUMENTS

| | | | |
|---|---|---|---|
| 3,798,365 | 3/1974 | Browning | 346/140 R |
| 4,312,009 | 1/1982 | Lange | 346/140 PD |
| 4,392,141 | 7/1983 | Inoue et al. | 346/76 R |
| 4,400,100 | 8/1983 | Aviram et al. | 346/76 R |
| 4,410,614 | 10/1983 | Lelental et al. | 346/76 R |
| 4,420,758 | 12/1983 | Tabata et al. | 400/120 |

*Primary Examiner*—J. V. Truhe
*Assistant Examiner*—A. Evans
*Attorney, Agent, or Firm*—Spensley, Horn, Jubas & Lubitz

[57] ABSTRACT

A photo-thermal ink transferring device includes an ink transferring drum which comprises a photoconductive layer on which inking material being in solid state at room temperature and having heat-fusing and semiconductive properties is coated and a transparent electrically-conductive layer which is provided on the opposite surface of the photoconductive layer. In ink transferring, while the desired portion of a paper onto which ink is transferred placed in contact with the coated inking material and while a proper current is passed through the coated inking material and transparent layer, light representative of a portion of image to be transferred is locally illuminated from the inner side of the electrically-conductive layer toward the photoconductive layer. As a result, the light-illuminated portion of the inking material coated on the photoconductive layer is locally self-heated by Joule heat phenomenon, so that the inking material is fused and transferred onto the paper. The above operation is repeated for the subsequent portions so that the whole image can be effectively transferred onto the paper.

12 Claims, 14 Drawing Figures

DR
PA
TH
TL
10
30
31
II
III
IV
11
12
13
14
15
16
17
18
19
20

PHOTO-THERMAL INK TRANSFERRING DEVICE

BACKGROUND OF THE INVENTION

The present invention relates generally to an ink transferring device, and more specifically, to a photothermal transferring device which is applicable to a printer, a copier, a telecopier an intelligent copier and the like.

In order to transfer images, especially, onto ordinary paper, there have been so far proposed the electrophotography, the ink jet and heatsensitive transfer techniques, and they have been already put into practical use.

Of these prior art techniques, the electrophotography requires complex steps of charging, exposing, developing, transferring, latent image erasing and cleaning for transferring a latent electrostatic image in photoreceptor onto paper, and therefore devices realizing these steps must be provided. As a result, the overall device becomes complex in its arrangement and costly, and improving reliability and making whole size compact are difficult.

The ink jet technique has an advantage that images can be transferred directly onto paper and the developing and fixing steps are unnecessary. However, this technique has many disadvantages such as clogging of nozzle.

In the heatsensitive transfer technique, special paper which exhibits color when subjected to heat must be used. Since such paper must be used for each copying the cost unfavourably becomes high.

SUMMARY OF THE INVENTION

In view of such circumstances, the present invention has been proposed, and it is an object of the invention to provide a novel photo-thermal ink transferring device which requires no special treatment on paper, is capable of transferring images onto paper at a high speed with a high resolution and a high reliability, and is compact and inexpensive.

To attain such an object, in a photo-thermal ink transferring device according to the present invention, transferring means comprises a photoconductive layer, and on one face of the layer inking material which is in solid state at room temperature and has heat-fusing and electrically-semiconductive properties, is coated and on the opposite face a transparent electrically-conductive layer is provided. In transferring, while a transfer face of a paper is placed in contact with the coated inking material and while a proper current is passed through the inking material and transparent layer, light image corresponding to a transferring content is illuminated from the inner side of the transparent layer toward the photoconductive layer. As a result, the illuminated portion of the photoconductive layer is locally decreased in its resistivity and thus the current passing through the layers is concentrated on the illuminated portion, so that the illuminated portions of the phtoconductive and the inking material are self-heated by the Joule heat phenomenon, whereby the inking material is locally fused in the illuminated portion. Thus, the fused inking material is fixed to the transfer face of the paper, whereby the image is effectively transferred onto the paper by means of light as a medium. In summary, the photo thermal ink transferring device according to this invention exhibits excellent effects that transferring of image with high resolution can be easily carried out at a high speed without performing charging, developing and fixing steps and without any treatment on paper to which image is transferred, and that the device can be simplified in arrangement and made compact.

BRIEF DESCRIPTION OF THE DRAWINGS

The present invention will be described with reference to preferred embodiments in conjunction with accompanying drawings, in which.

DESCRIPTION OF THE PREFERRED EMBODIMENT

Figure 1:
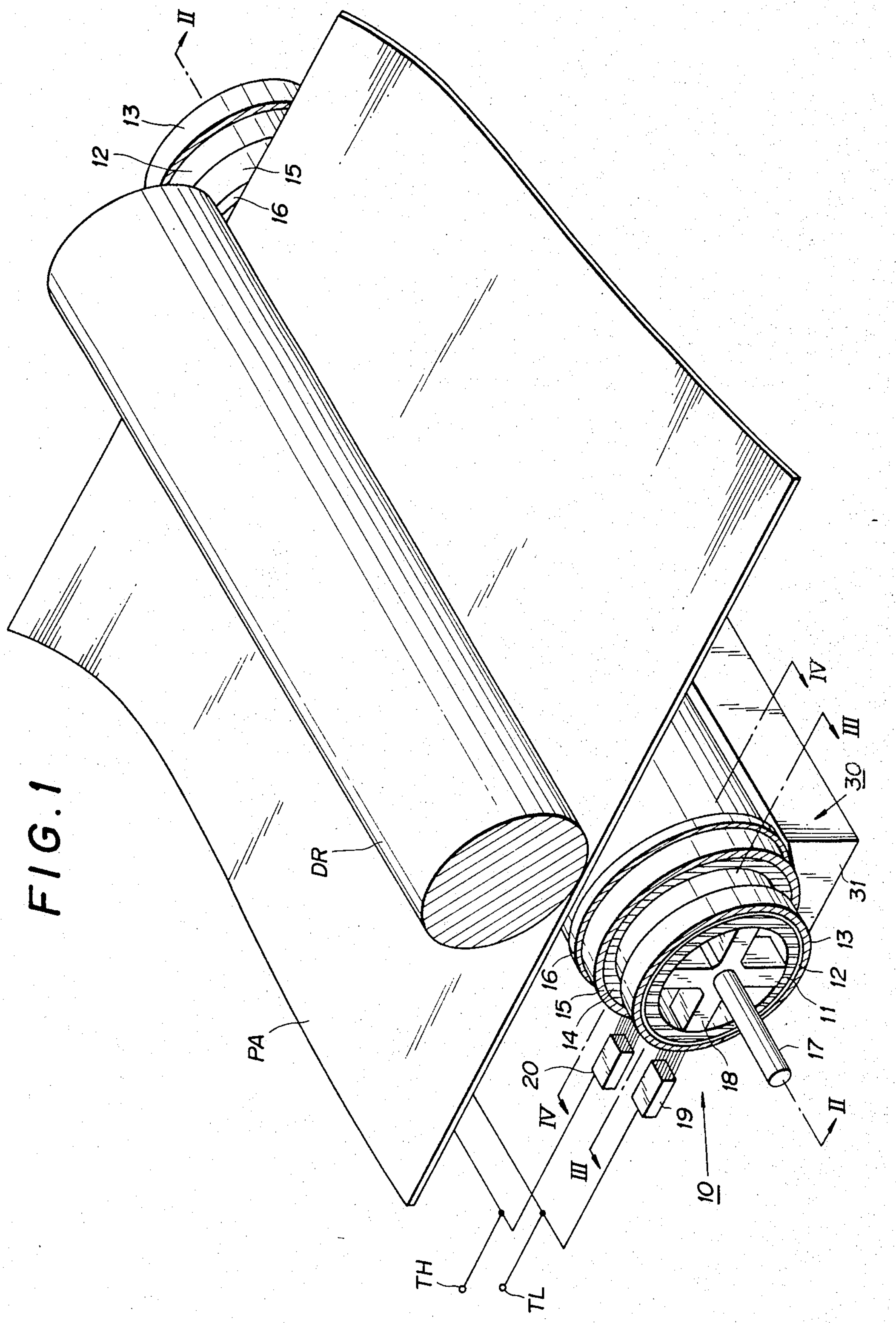
FIG. 1 is a perspective view of major part of a photothermal ink transferring device in accordance with an embodiment of the present invention.

Referring to FIGS. 1 to 4, an ink transferring drum 10 basically comprises a hollow drum base 11. The drum base 11 is made of, for example, transparent glass so that light is transmitted from an image illuminating section 40 (which will be described later) through the glass to the outside of the drum base 11. To ensure the light transmission, both the inner and outer faces of the drum base 11 are precisely and smoothly polished. Further, a supporting member 18 is fixedly provided at one open end of the drum base 11 by suitable means such as screws (not shown), and a shaft 17 is coupled to the supporting means 18 by means such as key grooves (not shown). The shaft 17 is coupled to drum driving means (not shown) so that the ink transferring drum 10 is rotated properly in response to the operation of the image illumination section 40.

The other open end of the drum base 11, on the other hand, remains open for the purpose of the mounting and electric connections (which will be detailed later) of the image illuminating section 40.

The drum base 11 is provided at its whole outer side with an electrically-conductive transparent layer 12. A predetermined thickness of the layer 12 is formed in such a way in which, for example, the drum base 11 is rotated for a predetermined time in a mixture atmosphere of indium oxide ($I_{n2}O_3$) and tin oxide ($SnO_2$) gases by the well known vacuum evaporation technique. In this case, the surface resistivity of the transparent layer 12 is about 50 Ω/□. Alternatively, a transparent electrode used in the field of solar cell or liquid crystal device may be employed in place of the transparent layer 12. This layer 12 is made to be transparent in order for light to pass favourably through the layer from the image illuminating section 40.

At both ends of the transparent layer 12 electrodes 13 of a proper width are provided. The electrode 13 is obtained, for example, by masking the drum base 11 in such a way that only desired portions are exposed and spraying a mixed material of urethane resin, epoxy resin and carbon black on and around the masked portions by means of a spray coater while rotating the drum base 11, and heating these portions at 100° C. for 30 minutes for hardening. In this case, the electrode 13 has a resistivity of about 50 Ω·cm. Of course, other electrodes of suitable metallic material may be used.

On the outer face of the treansparent layer 12 other than the electrodes 13, a photoconductive layer 14 made of non-crystalline silicon is coated. The photoconductive layer 14 is formed by the plasma CVD process in which, for example a mixture of 100 parts of phosphine gas ($PH_3$) with respect to one million parts of silane gas ($SiH_4$) is discharged and plasmanized or ionized, and then the masked drum base 11 is rotated in the plasmanized atmosphere. In this case, the photoconductive layer 14 has a resistivity of $10^7$Ω·cm when not illuminated and a resistivity of $1\times10^3$Ω·cm when illuminated with a light of 7000 Å whose intensity is 0.6 μJ/cm$^2$. The photoconductive layer 14 may be of an I type in which a minute quantity of hydrogen ($H_2$) is doped, or of a P type in which a minute quantity of an element belonging to group III in the Periodic Table is doped. It will be readily appreciated that the photoconductive layer 14 may be formed with other materials so long as the materials are commonly used in the electrophotographic field and do not lose their photoconductive property even when subjected to an increased temperature due to current flowing therethrough.

Furthermore, the photo conductive layer 14 is provided at its both ends with electrodes 15 of a proper width which are formed in the same manner as the electrodes 13.

In this embodiment, under the ink transferring drum 10 there is provided a coating section 30 for applying ink 16A, inking material. The coating section 30 comprises a pan 31 for containing the ink 16A and a hollow, metallic roll coater 32 having therein a heater (not shown). The outer surface of the roll coater 32 is heated by the heater to about 130° C.

The ink 16A, for example, consists, in weight percentage, of 20% of carnauba wax, 30% of ester wax, 25% of carbon black, 10% of softening agent, 5% of electrically-conductive filler and 10% of addition agent. The ink 16A has a desired color, and such electrically-semiconductive and heat-meltable properties that its melting point is 70° C. and its volume resistivity is approximately $1\times10^4$Ω·cm$^{-3}$.

It is in solid state at room temperature, and when heated it is melted.

The ink 16A is melted and coated on the surface of the photoconductive layer 14 between the electrodes 15 by means of the roll coater 32 to form a ink layer 16, whereby the ink-coated area between the electrodes 15 is made electrically conductive. Then, as the drum 10 rotates, the ink layer 16 is cooled and solidified, as will be described later. On the surfaces of the electrodes 13 and 15, there are electrically attached brush-shaped terminals 19 and 20 (not shown in FIGS. 2 to 4) which lead to their terminals TH and TL, respectively. Applied across the terminals TH and TL is a proper voltage which will be described later.

The image illuminating section 40 comprises an optical system 41 and a light source driver 42, and is extended inside the drum base 11 along its length and fixedly supported by proper means (not shown). The light emitted from the image illuminating section 40 is directed in a direction substantially opposed to the coating section 30. A roller DR is disposed as opposed to the image illuminating section 40 and the paper PA onto which the image is transferred is interposed between the roller DR and the image illuminating section 40 so that the paper PA is properly fed in a compressed relation against the ink transferring drum 10.

In one embodiment of the above-mentioned arrangement, the drum base 11 is made to be 80 mm, 300 mm and 3 mm in its outer diameter, length and thickness, respectively. The transparent layer 12 is formed to be about 5000 Å thick and the photoconductive layer 14 to be 5 μm thick. The electrodes 13 and 15 are both made to be 15 mm wide and about 30 μm thick, and the ink layer 16 of about 6 μm thick is coated on the photoconductive layer 14. The ink layer 16 is also extended to the each electrode 15 in an overlapped relation therewith by a width of about 5 mm. Note should be taken that FIGS. 1 to 4 are not shown to satisfy such structural dimensions but shown only for an easy understanding of the entire device arrangement of the present invention.

Figure 2:
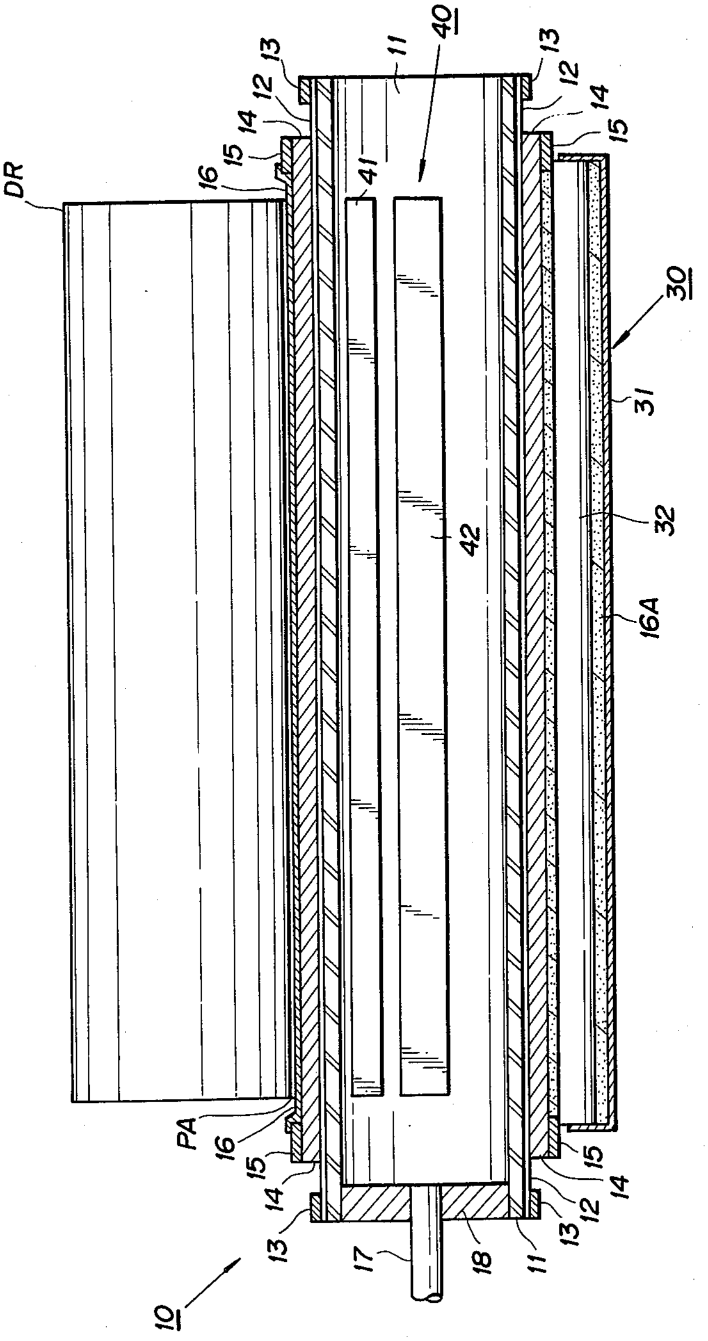
FIG. 2 is a sectional view of an ink transferring drum taken along line II—II in FIG. 1.

Next, explanation will be directed to the image illuminating section 40. The image illuminating section 40 is positioned and fixed in such a way that light emitted from this section illuminates the ink layer 16 coated on the photoconductive layer 14 as shown in FIG. 2.

Figure 5:
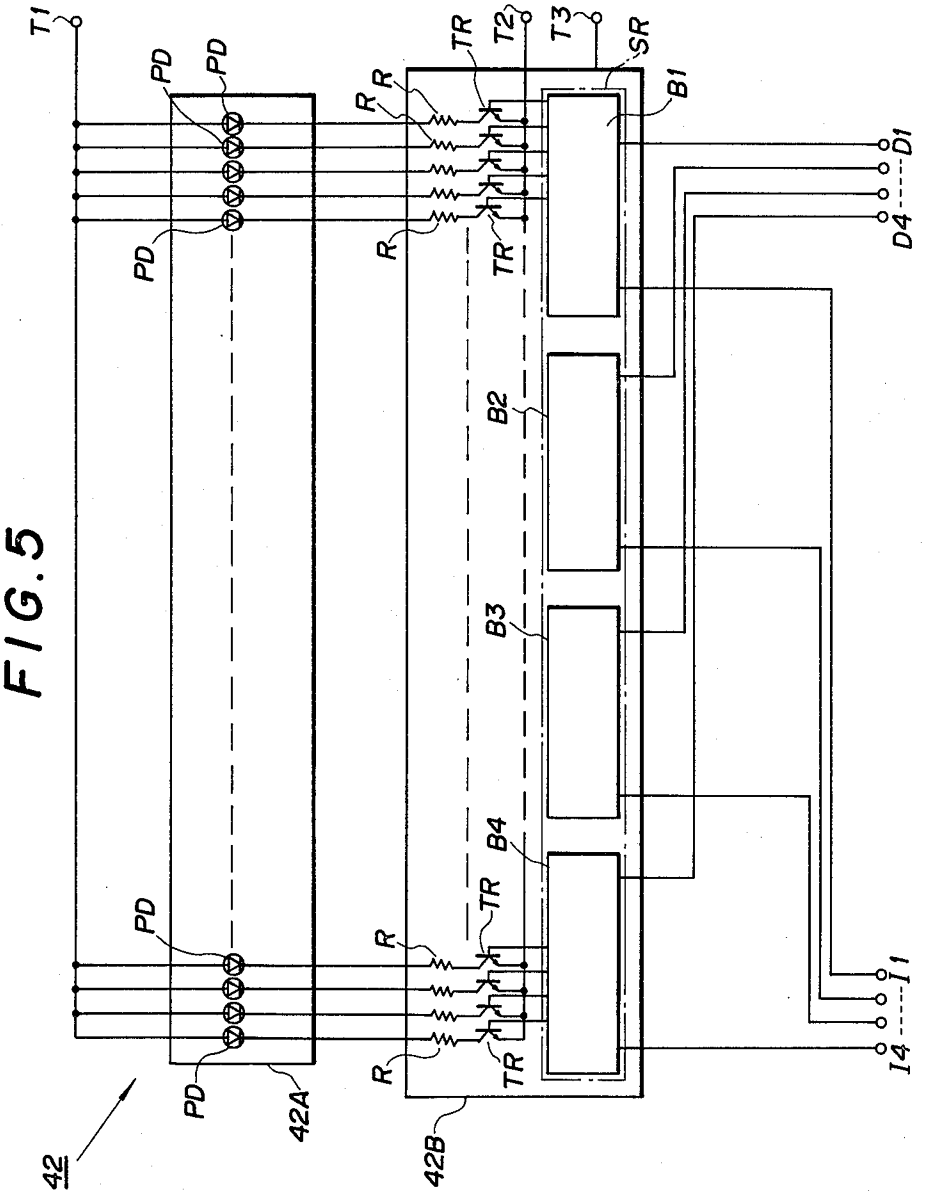
FIG. 5 is a circuit diagram of a light-source driver in the device shown in FIGS. 1 to 4.

As already mentioned, the image illuminating section 40 includes the optical system 41 and the light source driver 42. The optical system 41 comprises beam-condensing optical system such as Selfac (trade name). The light source driver 42 comprises, as shown in FIG. 5, an LED array 42A and a driving circuit 42B. The optical system 41 is provided to condense the light from the LED array 42A onto the photoconductive layer 14 and forms a spot of a proper diameter or size thereon. The LED array 42A also has a multiplicity of light emitting diodes PD arranged along the length of the ink transferring drum 10 at a density of 12 dots/mm. If a current of, for example, 2 mA is passed through the light emitting diode PD, then the diode PD emits a light having a wavelength of 7000 Å, yielding a power of 2 mW/cm$^2$. The anodes of the light emitting diodes PD are all connected to a common terminal T1 to which a proper biasing voltage for example, about 3 volts is applied. In this embodiment the LED array 42A has a length of 256 mm.

The cathods of the light emitting diodes PD are connected to associated elements in the driver circuit 42B. More specifically, the driver circuit 42B is mounted on the same substrate as the LED array 42A, and comprises a series-connected circuit of resistors R and transistors TR both corresponding in number to the light emitting diodes PD, as well as a shift register SR for serial-to-parallel conversion of data. The light emitting diode PD indicates one bit information through the presence or absence of the emitted light, and the anode of the diode is connected via the resistor R to the collector of the associated transistor TR. The transistor TR has an emitter connected to a common terminal T2 which is kept, for example, at ground potential, and a base connected to the shift register SR, thus a driver circuit corresponding to one bit is constructed. In the above embodiment, the resistors R, transistors TR and shift register SR of 64 bits are formed into a single silicon chip in an integrated circuit (IC) by the bipolar process, and a necessary number of such IC chips are mounted on the same substrate as the LED array 42A. If the number of the light emitting diodes PD is 3072, then the necessary IC chip number will be 48 since one IC chip contains 64 bits.

The IC chip has series input terminals and series output terminals, a desired number of such IC chips are combined into a block, and data and enable signals are supplied to each of blocks B1 to B4. In the above embodiment, twelve IC chips, that is, 768 bits ($64\times12$) are formed into one block and a total of 4 blocks are used. Further, a clock pulse is applied through a terminal T3 to the driver circuit 42B, and the blocks B1 to B4 are provided with data terminals D1 to D4 and enable terminals I1 to I4, respectively.

Figure 6:
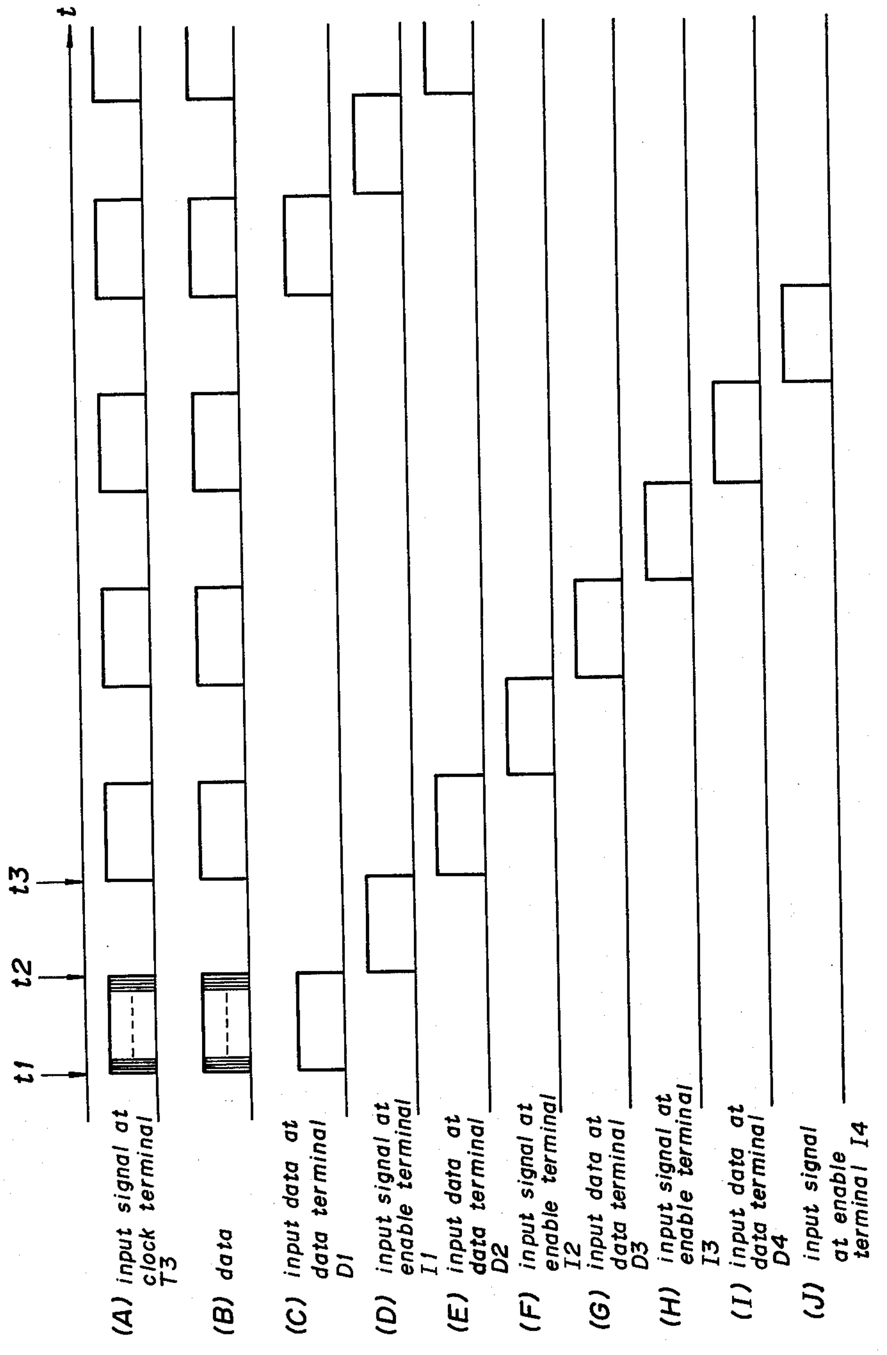
FIG. 6 is a timing chart showing an operational example of the circuit of FIG. 5.

The operation of the light source driver 42 will next be described in connection with a timing chart shown in FIG. 6. In this embodiment, the clock pulse has a frequency of 10 MHz.

First, when the clock pulse (FIG. 6(A)) is applied at a time t1, a series of data (FIG. 6(B)) between times $t_1$ and $t_2$ is applied to the block B1 (FIG. 6(C)). This data contains 768 bits and at the time t2, an enable signal is applied to the enable terminal I1 for a predetermined time duration. This causes the 768 light-emitting diodes PD connected to the block B1 to be driven. At a time t3 and subsequent times, the blocks B2, B3 and B4 are sequentially operated in the same manner. In this connection, the clock pulse shown in FIG. 6(A) is not a single pulse but a group of pulse train. The same is applied for the data of FIG. 6(B).

Accordingly, if the time durations of signals applied to the enable terminals I1 to I4 are each 100$\mu$ sec, then the time necessary for light emission per line is $(76.8\times4)+(100\times4)=707.2$ $\mu$ sec. For example, in case that an image is transferred onto a paper of B4 size in accordance with the Japanese Industrial Standards on a some 3000 dot line basis, the necessary light-emitting time for transferring is about 3 sec. Lights emitted from the associated diodes PD through the above-mentioned operation are passed through the optical system 41, so that the lights are focused on the photoconductive layer 14 of the transferring drum 10.

Figure 7:
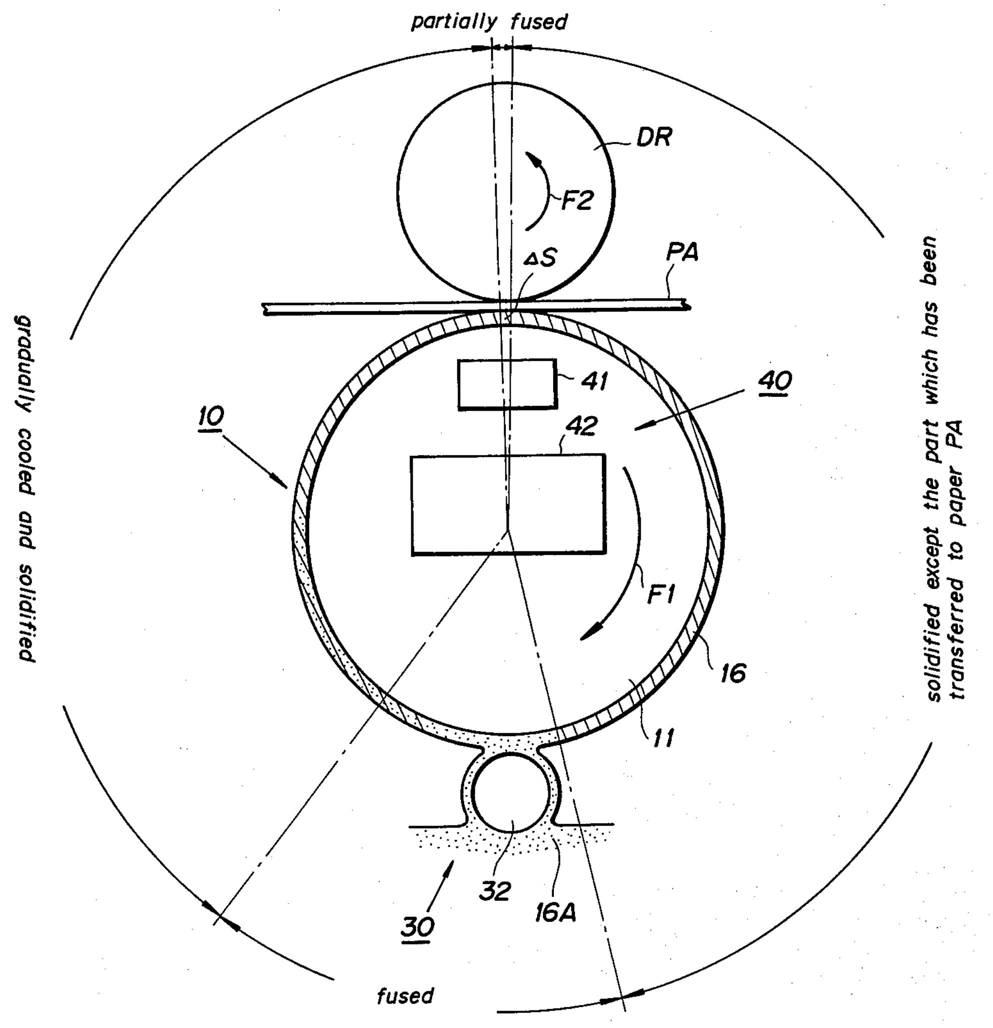
FIG. 7 is an explanatory view showing how ink and an ink layer in the device are fused and solidified at different positions.
Figure 9:
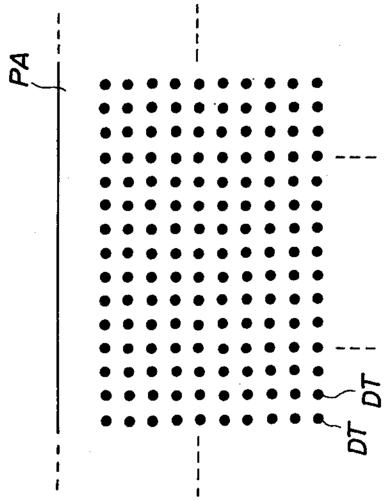
FIG. 9 shows an example of image transferred onto a paper.
Figure 10:
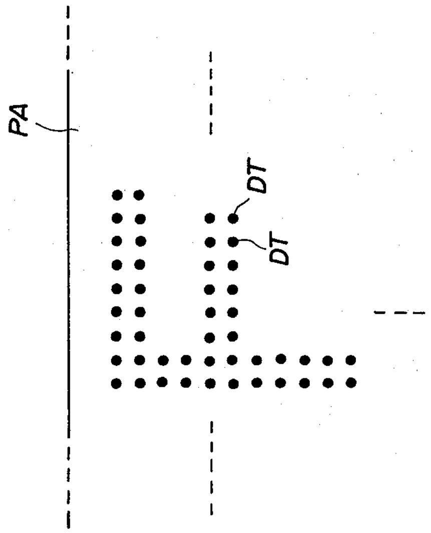
FIG. 10 is another example of image transferred onto a paper.

Explanation will next be made as to the overall operation of the above embodiment with reference to FIGS. 7 through 10. FIG. 7 shows how the ink 16A and ink layer 16 are fused and solidified at different positions, FIG. 8 shows how a current flows in the ink transferring drum 10, FIG. 9 shows how the ink is transferred to the paper PA when all the diodes PD are turned on to emit light, and FIG. 10 shows how a letter "F" is transferred onto the paper PA.

As shown in FIG. 7, the ink 16A is first coated on the ink transferring drum 10 in a melted or fused state by means of the high-temperature coating section 30. As the ink transferring drum 10 rotates in an arrow F1 direction, the ink coated on the drum moves away from the high temperature section 30 and thus the ink layer 16 will be gradually cooled and solidified. Subsequently, as the drum 10 further rotates, the solidified ink layer 16 arrives at the top of the drum in FIG. 7, that is, at a position in which the ink layer 16 receives light from the image illuminating section 40. The drum rotation causes the roller DR which is provided opposite to the drum 10 to be rotated in an arrow F2 direction, whereby the paper PA therebetween is placed into contact with the ink layer 16.

On the other hand, a proper voltage is applied across the terminals TH and TL. For example, potentials of 180 and 0 volts are applied to the terminals TH and TL, respectively.

Figure 8:
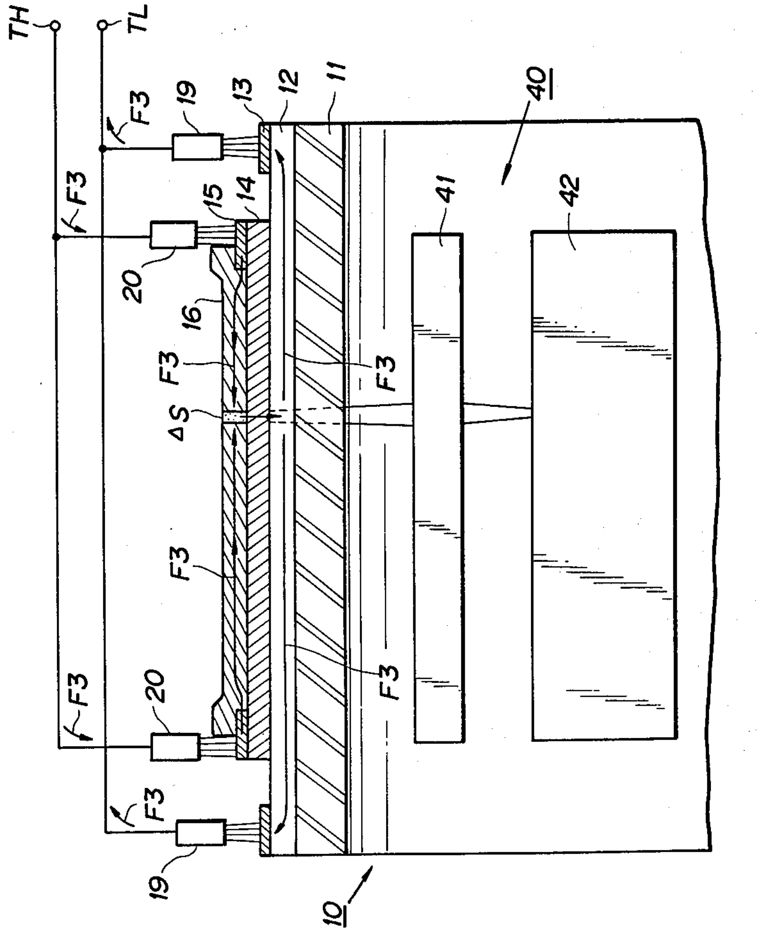
FIG. 8 is an explanatory view showing how a current flows in the ink transferring drum of the device.

When the photoconductive layer 14 is not exposed to light, the current path between the terminals as shown in FIG. 8 will not be completed and thus, substantially no current will flow. Under this condition, light emitted from the image illuminating section 40 will pass through the drum base 11 and electrically-conductive transparent layer 12 and reach the photoconductive layer 14. As a result, the portion of the photoconductive layer 14 which is exposed to the light is locally made electrically conductive so that currents will flow in directions shown by arrows F3 in FIG. 8. More specifically, the currents will flow first from the terminal TH via the brush-shaped terminals 20 and electrode 15 into the ink layer 16. Then, the currents will pass through the light-exposed area of the layer 14, transparent layer 12, electrodes 13 and brushes 19 finally to the terminal TL.

In this way, all the currents are concentrated on a region ΔS of the ink layer 16 which is disposed above the light-exposed portion of the photoconductive layer 14 and, therefore the heat regions ΔS begins to have a higher current density and generate heat by the Joule heat effect. In the above embodiment the current flowing between the terminals TH and TL is about 2.2 mA, and the light-exposed portions of the ink layer 16 and photoconductive layer 14 have resistances of 60KΩ and 6KΩ in their vertical (thickness) directions and have power consumptions of 300 mW and 30 mW, respectively.

The region ΔS in the ink layer 16 is heated to about 250° C. by the Joule heat and thus the layer 16 is locally fused, whereby the ink 16A will be partially transferred onto the paper PA. It will be readily appreciated that, when such operation occurs for all the light emitting diodes PD shown in FIG. 5, such a dot (DT) array as shown in FIG. 9 will be presented on the paper PA.

After the above operation has been completed, the ink layer 16 will be then rotated in the arrow F1 direction as shown in FIG. 7 and again sent to the coating section 30 to again from the uniform coated ink layer 16. The above operation will be repeated.

Further, if the light emitting operation of the diodes PD is controlled by proper data provided to the image illuminating section 40, then any letter such as the "F" shown in FIG. 10 can be transferred onto the paper PA in the form of the combination of the dots DT. In this embodiment, the dot density is 12 dots/mm and the image density (ID) is 1.2. As a result, the dots DT are favourably separated from one another and a good quality of highly clear image can be obtained without any appreciably contaminated formation, unevenly distributed ink or missing dots.

Figure 12A:
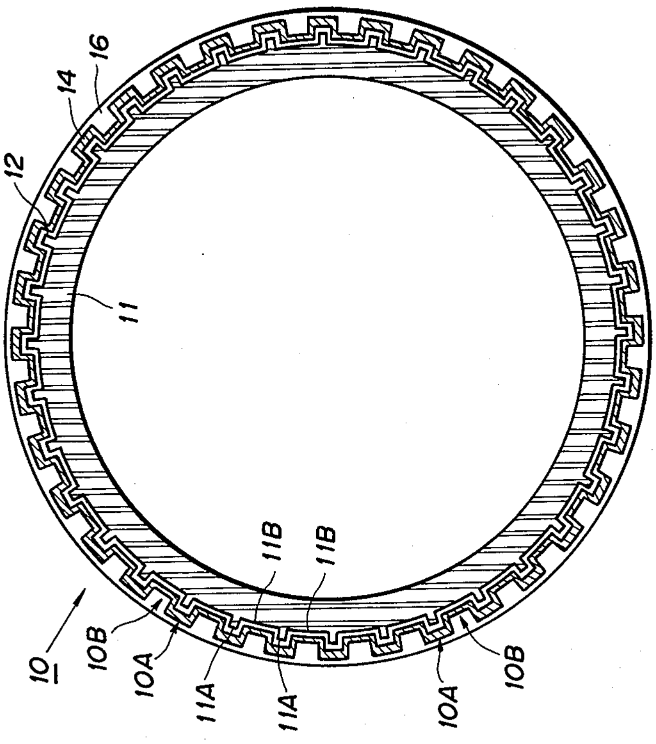
FIG. 12(A) is a sectional view showing the detailed structure of an ink transferring drum in the second embodiment.
Figure 12B:
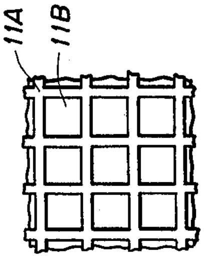
FIG. 12(B) is an explanatory view showing how the surface of a base drum is formed.
Figure 11:
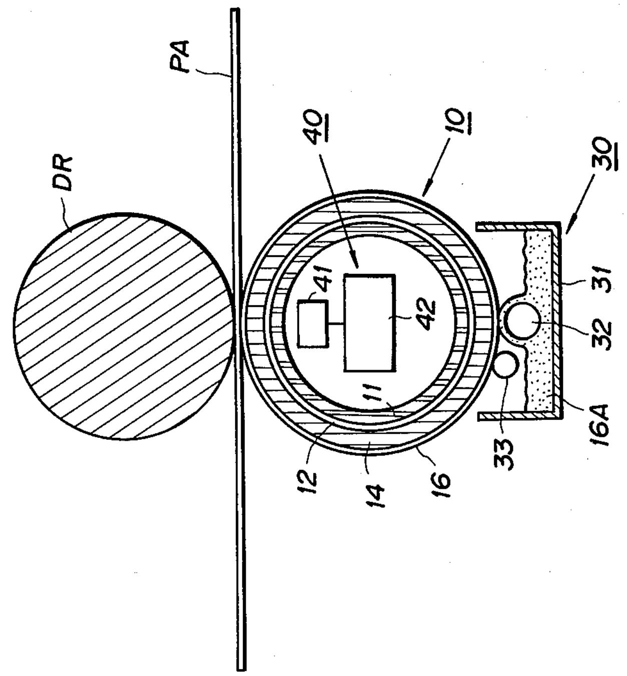
FIG. 11 is a sectional view showing the structure of a coating section in another embodiment of the photothermal ink transferring device according to this invention.
Figure 13:
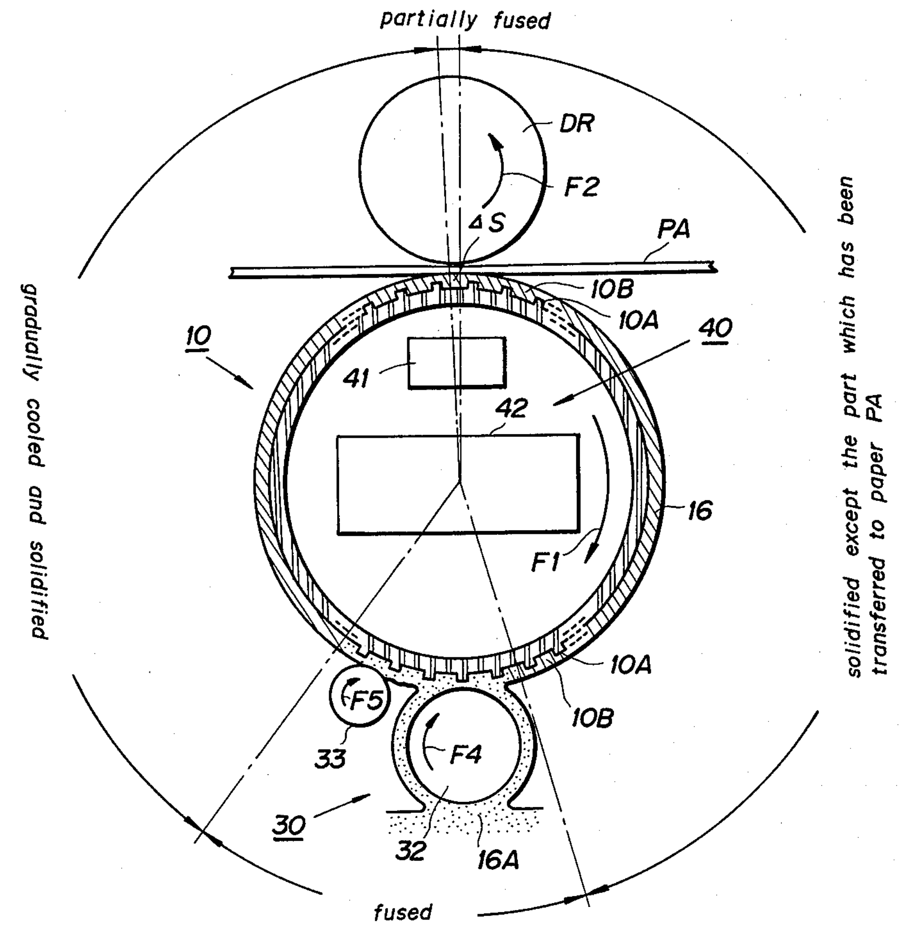
FIG. 13 is an explanatory view showing how ink and an ink layer in the second embodiment are fused and solidified at different positions.

Referring now to FIGS. 11 to 13, there is shown another embodiment of the photo-thermal ink transferring device according to this invention. This embodiment is different from the previous one in that the arrangements of the coating section 30 and ink transferring drum 10 are modified. In FIGS. 11 to 13, the same elements and members as those in the embodiment of FIGS. 1 to 5 are denoted by the same reference numerals and symbols and the explanation thereof is omitted.

Figure 4:
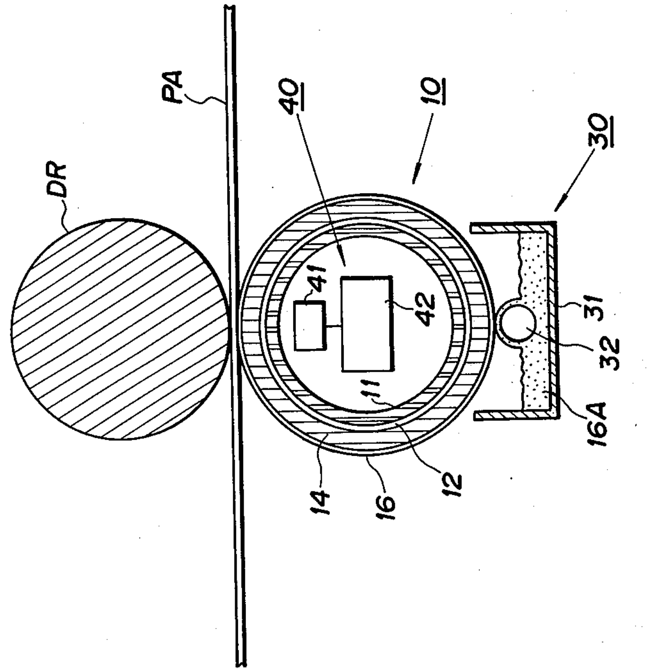
FIG. 4 is a sectional view taken along line IV—IV in FIG. 1.
Figure 3:
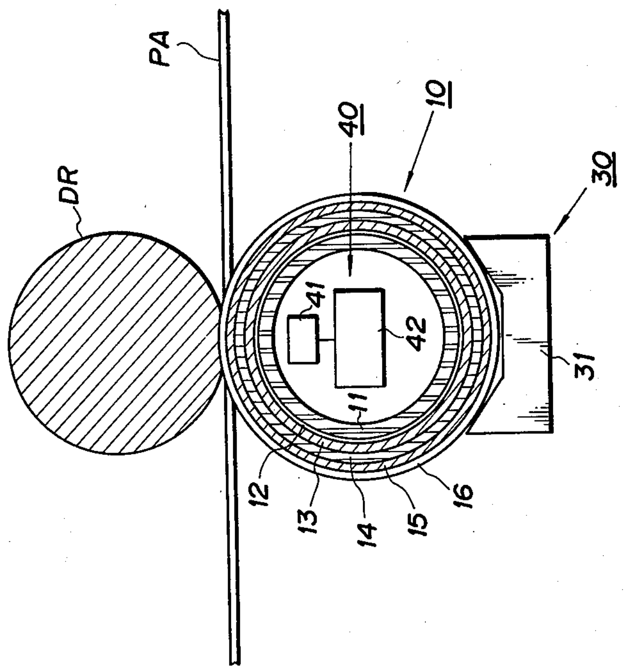
FIG. 3 is a sectional view taken along line III—III in FIG. 1.

FIG. 11 shows another arrangement of the coating section 30 used in the second embodiment, and corresponds to the sectional view of the coating section of FIG. 4. As illustrated in FIG. 11, the coating section 30 comprises the pan 31 for containing the ink 16A, the hollow, metallic roll coater 32 which rotates in reverse direction to the drum 10 and has a heater (not shown) therein and a pressure roll 33. As in the previous embodiment the outer surface of the roll coater 32 is heated to about 130° C. by means of the heater built in the coater.

The ink 16A is melted by the roll coater 32 and coated on the photosensitive layer 14 between the electrodes 15 of the drum 10 so that the electrodes 15 are electrically connected to each other. At the same time, the ink layer 16 is uniformly pressed against the ink transferring drum 10 by means of the pressure roll 33. After this, as the drum 10 rotates, the ink layer 16 is cooled and solidified.

FIG. 12 shows a enlarged section of the ink transferring drum 10 used in FIG. 11. As shown in FIG. 12(A), the drum base 11 is provided over its whole outer face with a parallel lattice. The lattice is made of a large number of fine-meshed raised strips 11A. Correspondingly, substantially rectangular recessed portions are defined by the raised strips 11A, as shown in FIG. 12(B). The electrically-conductive transparent layer 12 and photoconductive layer 14 are each formed sequentially on the base drum 11 so as to have a constant thickness regardless of the projections and recesses formed on the drum base 11. That is raised portions 10A and recessed portions 10B corresponding to the ones 11A and 11B are formed by the layer 14 on the outer side of the recording drum 10.

The ink layer 16 is coated to have a substantially circular face (when viewed from its section) although the raised and recessed portions 10A and 10B exist on the drum 10. The raised and recessed portions on the drum 10 is not necessarily made to have such a configuration as shown in FIG. 12, and any configuration may be employed so long as it is used for an ordinary rotogravure roll. In this embodiment, the recessed portion 11B on the drum base 11 is formed to be a 30×30 μm square, the depth of the recess 11B is 4 μm and the recess pitch is 45 μm.

The recessed and raised portions on the drum base 11 may be molded at the time of molding the drum base 11, or alternatively may be formed by first shaping a material into a hollow cylinder or tube and then machining the tube using a proper technique. For example, such projections and recesses are formed on the tube by the etching technique available in the field of semiconductor and integrated circuit.

Next, the ink coating operation of this second embodiment will be detailed by referring to FIG. 13. As shown in FIG. 13, the ink 16A is applied on the ink transferring drum 10 by means of the roll coater 32 of the coating section 30 rotating in a direction shown by an arrow F4. The coater 32 is rotatably disposed as opposed to the ink transferring drum 10 so that the ink 16A is desirably loaded into the recesses 10B of the drum 10. The same explanation is applied for the pressure roll 33. That is, the ink 16A coated on the drum 10 is desirably pressed against the drum 10 by the roll 33, since the drum 10 rotates in the arrow F1 direction and the roll 33 rotates in a direction shown by an arrow F5 in FIG. 13. Further, since the roll 33 is made of a highly-releasable silicon rubber, most of the ink 16A on the drum 10 are favourably packed into the recesses 10B through the pressing operation of the rubber roll, whereby a very thin ink layer 16 is formed on the projections 10A. When the ink layer 16 on the projections 10A is made thinner by properly adjusting the roll 33, the thickness of the ink layer 16 will, as a whole, depend on the depth of the recess 10B. In other words, since the ink layer 16 can be made substantially uniform, this will not require the roll coater 32 to have a high coating accuracy, mechanical accuracy and a high degree of adjustment. In this embodiment, as already mentioned, the depth of the recess 10B and the thickness of the ink layer 16 are selected to be 4 μm and about 6 μm, respectively.

As the ink layer 16 pressed against the drum 10 in the above mentioned manner moves away from the high temperature coating section 30, the inked layer 16 will be gradually cooled and solidified. The solidified ink layer 16 is further sent to the top position, that is, a position in which the layer 16 is exposed to light emitted from the image illuminating section 40, while the paper PA is placed in contact with the ink layer 16 by means of the opposing roller DR rotating in the arrow F2 direction. The transfer of the ink 16A to the paper PA and the subsequent operations are similar to those already explained in connection with the previous embodiment, and the descriptions thereof are omitted.

The photoconductive layer 14 is made of non-crystalline silicon in the above two embodiments because of its excellent heat-resistivity, but other materials such as ZnO may be employed. Further, the materials of other members used in this embodiments are not restricted only to those disclosed in the above embodiments, and any suitable materials may be used. Furthermore, although the roll coater 32 is used as an ink coating device in the coating section 30, suitable other coating means such as a rotogravure roll, an immersing device or a spraying device may also be employed. The optical system 41 of the image illuminating section has a beam-condensing optical system such as Selfoc (trade name) lens and the LED array 42A is used, but any illumination element such as a magnetic-optical element or a semiconductor laser and any such array as a transmission liquid-crystal array or a magnetic bubble array may be utilized. In the case where the present invention is applied to a copying machine or copier, the same effects as in the above embodiments can be obtained by guiding light reflected by the original document via lenses or mirrors.

In addition, while the driver circuit for the LED array 42A is divided into a desired number of blocks which are separately driven in the above embodiments, other driving system may be employed. For example, the invention may be arranged as a whole in such a way that data are inputted into the driving circuit on a parallel processing basis and subsequently the LED array 42A is driven at a time. In this connection, if a memory circuit, for example, a latch circuit is inserted between the shift register SR and transistor TR in the driving circuit, the data input and output operations can be effected on a parallel processing basis, whereby the processing time can be reduced and the high-speed recording can be achieved.

In the present invention, the optimum time period during which the current shown in FIG. 8 flows should be determined by the heat capacity, the resistivity of the ink 16A and so on, and such current flowing time can be controlled, for example, by varying the illumination time of the LED array 42B.

The above embodiments are both arranged, for the most practical applications, so as to simultaneously satisfy the following three conditions, that is, (1) the desired data transferring on the paper, (2) the automatic paper feeding, and (3) the automatic and periodical formation of inking material into the ink layer 16, in response to the rotation of the ink transferring drum 10 comprising the cylindrical drum base 11 on which the electrically-conductive transparent layer 12, photoconductive layer 14 and inked layer 16 are sequentially provided. However, it will be readily understood to those skilled in the art that the present invention is not limited only to the particular embodiments, but rather includes all other possible modifications, alterations and equivalent arrangements within the scope of appended claims. That is, the photo-thermal ink transferring device can be substantially realized so long as the device comprises, at least, transferring means having a transparent base member, an electrically-conductive transparent layer, a photoconductive layer and a inking material layer, said layers being formed sequentially on said base member, said inking material being in its solid state at room temperature and having a heat-fusing and electrically-semiconductive properties; press means for pressing a paper against the inking material layer of said transferring means; means for passing a current through said transparent and inking material layers; and image illuminating means for illuminating light indicative of a desired image through said base member and transparent layer on that area of said photoconductive layer having thereon the material layer against which said paper is pressed. Therefore, said transferring means is not restricted only to the drum-shaped structure and may be made, for example, into a plate shaped structure in which said image illuminating means can be scanned on the copying paper in its lengthwise and crosswise directions.

What is claimed is:

1. A photo-thermal ink transferring device comprising ink transferring means having a transparent base member, a transparent electrically-conductive layer, a photoconductive layer and a inking material layer, said layers being formed sequentially on said base member, said inking material being in its solid state at room temperature and having a heat-fusing and electrically-semiconductive properties;

paper pressing means for pressing a printing medium onto which image is transferred against said inking material layer on said ink transferring means;

electric current flowing means for making an electric current flow through said transparent and inking material layers; and image illuminating means for illuminating light representing image to be transferred through said base member and electrically-conductive layer at least on the area of said photoconductive layer in contact with the ink material layer against which said printing medium is pressed.

2. A photo-thermal ink transferring device as set forth in claim 1 wherein said ink transferring means comprises a drum provided at its inner face with said base member, and said printing medium is fed by the rotation of said ink transferring means and paper pressing means.

3. A photo thermal transferring device as set forth in claim 2, further comprising coating means for coating said inking material when said ink transferring means rotates.

4. A photo-thermal ink transferring device as set forth in claim 3 wherein said coating means comprises a pan for containing said inking material and a metallic roll coater having a heater therein.

5. A photo-thermal ink transferring device as set forth in claim 3 wherein said coating means comprises a pan for containing said inking material, a metallic roll coater rotating in a direction opposite in rotation to said ink transferring means and having a heater therein, and a pressure roll for pressing the inking material which is coated on said ink transferring means by said oppositely-rotating coater against said photoconductive layer at a predetermined pressure.

6. A photo-thermal ink transferring device as set forth in claim 5 wherein at least said photoconductive layer is formed at its face with a multiplicity of recessed portions.

7. A photo-thermal ink transferring device as set forth in claim 2 wherein said ink transferring means further comprises a first circular electrode electrically connected to said transparent layer and a second circular electrode electrically connected to said coated inking material, said first and second electrodes being provided at respective ends of said ink transferring means, and wherein said electric current flowing means makes electric current flow by means of first and second brushes slidably connected to the respective first and second electrodes.

8. A photo-thermal ink transferring device as set forth in claim 2 wherein said image illuminating means comprises an LED array which is lit corresponding to the image to be transferred onto the printing medium and an optical system for condensing the light emitted from said LED array on said photoconductive layer to form thereon an image of a desired spot size.

9. A photo-thermal ink transferring device as set forth in claim 8 wherein said optical system is a beam condensing optical system.

10. A photo-thermal ink transferring device as set forth in claim 1 wherein said electrically-conductive layer is made of indium tin oxide (ITO).

11. A photo-thermal ink transferring device as set forth in claim 1 wherein said photoconductive layer is made of non-crystalline silicone.

12. A photo-thermal ink transferring device as set forth in claim 1 wherein said inking material is ink which consists, in weight percentage, of 20% of carnauba wax, 30% of ester wax, 25% of carbon black, 10% of softening agent, 5% of electrically-conductive filler and 10% of addition agent.

* * * * *